Figure 1:
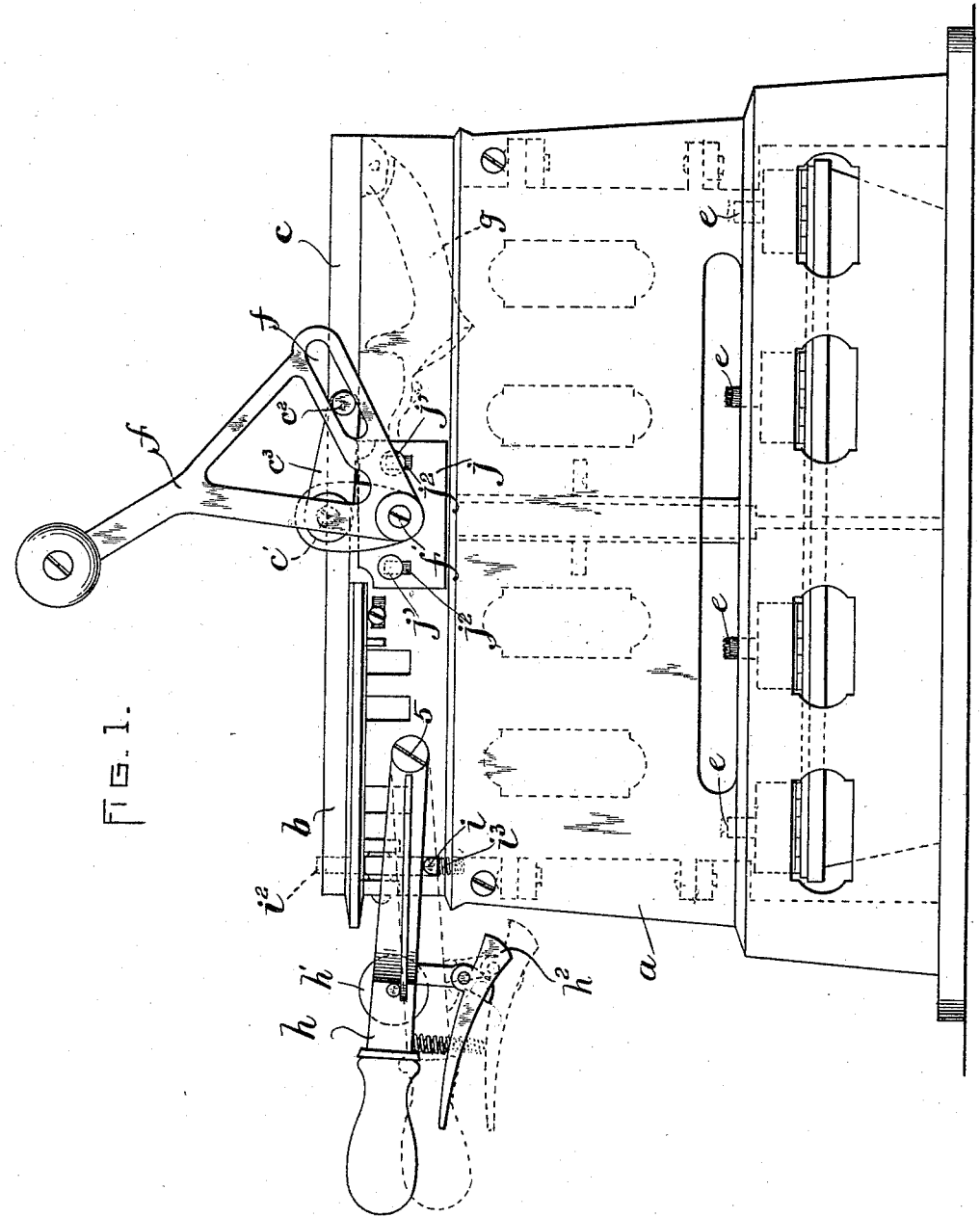

(No Model.)  3 Sheets—Sheet 1.

P. H. HORAN.
APPARATUS FOR BAKING ALTAR BREAD.

No. 474,601. Patented May 10, 1892.

WITNESSES:

INVENTOR:

(No Model.) 3 Sheets—Sheet 2.
P. H. HORAN.
APPARATUS FOR BAKING ALTAR BREAD.
No. 474,601. Patented May 10, 1892.
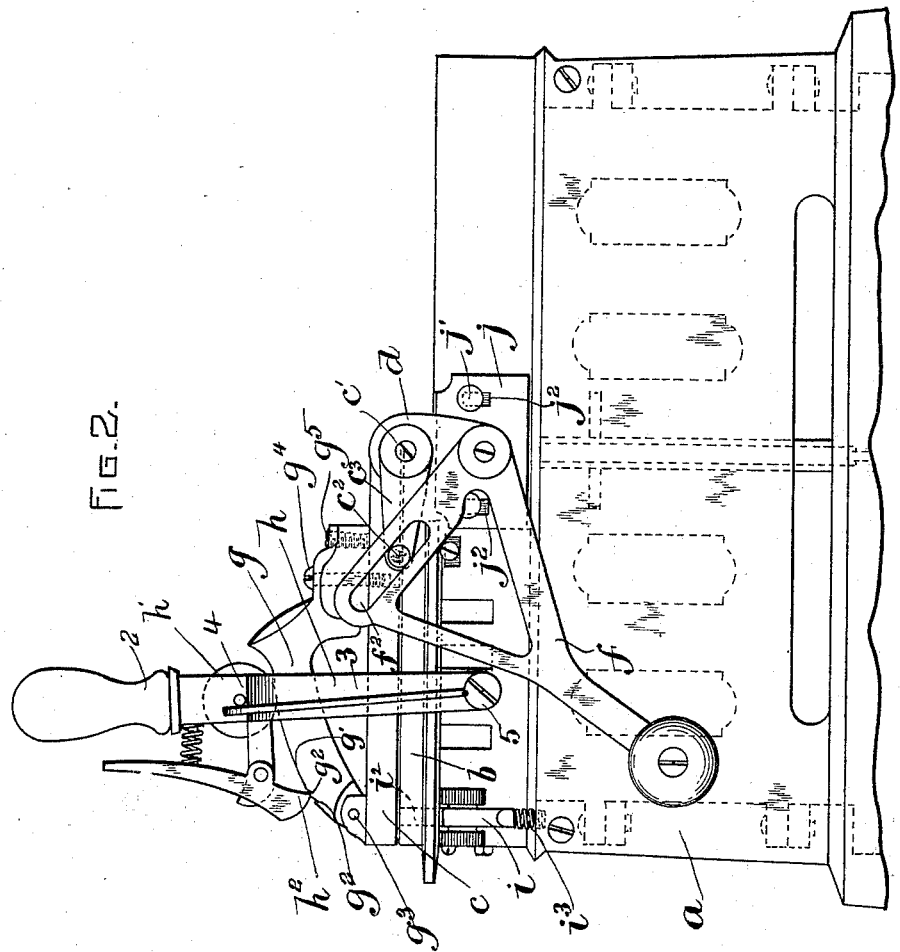
WITNESSES:
A. D. Harrison
A. H. Brown
INVENTOR:
P. H. Horan
by Wright Brown Quimby
Attys.

(No Model.) 3 Sheets—Sheet 3.
P. H. HORAN.
APPARATUS FOR BAKING ALTAR BREAD.
No. 474,601. Patented May 10, 1892.
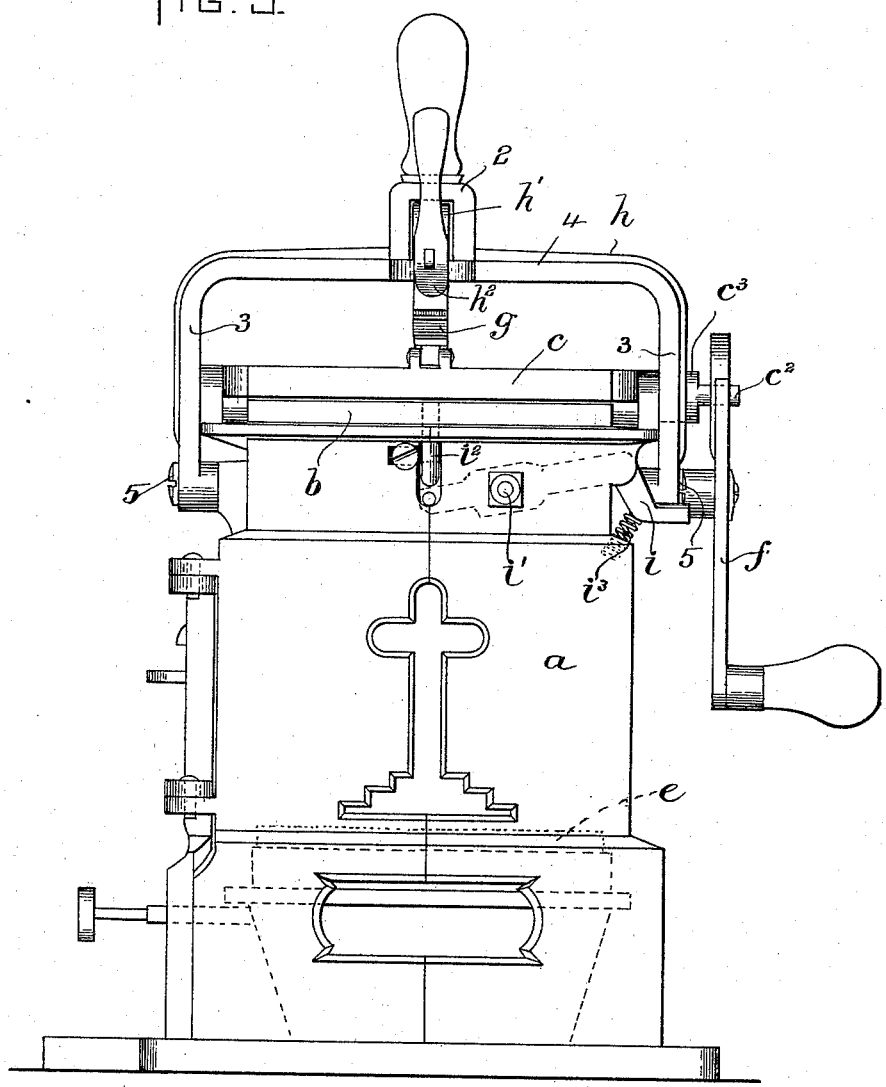

UNITED STATES PATENT OFFICE.

PATRICK H. HORAN, OF BOSTON, MASSACHUSETTS.

APPARATUS FOR BAKING ALTAR-BREAD.

SPECIFICATION forming part of Letters Patent No. 474,601, dated May 10, 1892.

Application filed February 1, 1892. Serial No. 419,876. (No model.)

*To all whom it may concern:*

Be it known that I, PATRICK H. HORAN, of Boston, in the county of Suffolk and State of Massachusetts, have invented certain new and useful Improvements in Apparatus for Baking Altar-Bread, of which the following is a specification.

This invention is an improvement on the apparatus shown in Letters Patent of the United States No. 184,623, dated November 21, 1876, for baking the wafers or altar-bread used by the Catholic Church; and it consists in the several improvements which I will now proceed to describe and claim.

In the accompanying drawings, forming a part of this specification, Figure 1 represents a side elevation of my improved apparatus, showing the hinged baking-plate in position to be heated. Fig. 2 represents a similar view showing the hinged baking-plate in position for baking. Fig. 3 represents an end view, the hinged plate being in the position shown in Fig. 2.

The same letters and figures of reference indicate the same parts in all the figures.

In the drawings, $a$ represents a suitable supporting-frame, on the upper part of which is a fixed flat baking-plate $b$ and a hinged baking-plate $c$, the hinged plate having trunnions $c'$, which are journaled in suitable ears or bearings $d$, affixed to the frame $a$. The hinged plate $c$ is so arranged that it can occupy the position shown in Fig. 1, resting upon the top of the frame $a$, or the position shown in Fig. 2, resting upon the upper surface of the plate $b$ or upon the batter which is spread upon the plate $b$ preparatory to the operation of baking the bread or wafer. The main portion of the frame $a$ is hollow and adapted to contain suitable burners $e$ for the purpose of heating the plates $b\ c$. Said burners may be supplied with any suitable combustible material, such as oil or gas. When the hinged plate is in the position shown in Fig. 1, it receives heat from the burners below it, the plate $b$ being heated at the same time.

$f$ represents a lever, which is pivoted at $f'$ to the supporting-frame and has a slot $f^2$, which receives a stud $c^2$ on an arm $c^3$, affixed to one of the trunnions of the plate $c$. The lever $f$ and its slot $f^2$ are so arranged that said lever in moving from the position shown in Fig. 1 to that shown in Fig. 2 will throw the hinged plate $c$ over upon the fixed plate $b$, as shown in Fig. 2. To the side of the plate $c$ which is uppermost when said plate is in its baking position is affixed a rib $g$, which has a cam-shaped upper edge or face $g'$, provided with ratchet-teeth $g^2$.

$h$ represents a lever, which is composed of a handle portion 2, two side arms 3 3, and the connecting cross-bar 4, as clearly shown in Fig. 3. The said lever is pivotally connected to the frame $a$ by means of screws or pivots 5 5, passing through the ends of the side arms 3 3 into suitable sockets on the frame. The lever $h$ is provided with an anti-friction roller $h'$, which is arranged to bear on the cam-shaped surface $g'$ of the rib $g$, and with a dog $h^2$, arranged to engage one of the ratchet-teeth $g^2$ of said rib. The roller $h'$ and cam-shaped surface $g'$ are so arranged that when the lever $h$ is swung upwardly from the position shown in Fig. 1 to that shown in Fig. 2 the roller $h'$ will bear upon the cam-shaped surface $g'$ and exert a downward pressure through the rib $g$ upon the hinged plate $b$, said pressure being sufficient to closely press the batter between the two baking-plates, said pressure being retained by the engagement of the dog $h^2$ with one of the ratchet-teeth $g^2$.

The operation of the apparatus above described is as follows: The baking-plates $b\ c$ being in the positions shown in Fig. 1 and suitably heated by the burners $e$, the batter is poured upon the plate $b$, and then the plate $c$ is moved by the lever $f$ to the position shown in Fig. 2, so that it rests upon the batter. The operator then moves the lever $h$ from the position shown in Fig. 1 to that shown in Fig. 2, thus causing the roller $h'$ to exert downward pressure upon the plate $c$, compressing the batter, the dog $h^2$ at the same time engaging one of the teeth $g^2$ and confining the plate $c$. When the wafer has been sufficiently baked, the operator swings the lever $h$ back to the position shown in dotted lines in Fig. 1, and in so doing causes one of the side arms 3 of said lever to bear upon the outer end of another lever $i$, which is pivoted at $i'$ to the frame $a$ and is connected at one end with a vertically-sliding pin $i^2$, adapted to pass through an orifice in the fixed baking-plate $b$. The object of the lever $i$ and the pin $i^2$ is to slightly raise the hinged plate *c* preparatory to throwing said plate back to the position shown in Fig. 1 by means of the lever *f*. It is found that after the wafer has been baked the hinged plate *c* is liable to adhere closely to the wafer by reason of atmospheric pressure, so that it is often difficult to raise the said plate by means of the lever *f*. This difficulty is overcome by the use of the lever *i* and pin $i^2$, the same co-operating with the lever *h* in starting the upward movement of the plate *c*. The lever *i* is normally held by a spring $i^3$ in the position required to retract the pin $i^2$ and hold the same below or flush with the upper surface of the plate *b*. The ears *d d*, which support the trunnions of the hinged plate *c*, are rendered vertically adjustable to vary the thickness of the wafer by means of a plate *j*, to which said ears are affixed, said plate being secured to the frame *a* by means of screws or bolts *j'*, passing through vertical slots $j^2$ in said plate. The rib *g* may be adjusted to compensate for adjustments of the ears *d*, said rib being pivoted at one end at $g^3$ to ears on the plate *c* and having its other end secured to said plate by a screw $g^4$, entering a threaded socket in the plate. When said screw is loosened, the end of the rib *g* through which it passes may be raised from the plate *c* and supported at any desired point by means of a bearing-screw $g^5$, which passes through the rib *g* near one end thereof and bears upon without entering the plate *c*.

It will be seen that the described apparatus is simple, easily operated, and not liable to get out of order.

I claim—

1. In an altar-bread baker, the combination of a supporting-frame having heating devices, a fixed baking-plate, a hinged baking-plate, an operating-lever engaged with said hinged plate and adapted to move it from one position to another, a locking-lever adapted to exert and maintain downward pressure on the hinged plate when the latter is in its baking position, and a plate lifting or starting device arranged to be operated by the depression of the locking-lever, whereby the hinged plate may be given its initial upward movement, as set forth.

2. In an altar-bread baker, the combination of a supporting-frame having heating devices, a fixed baking-plate, a hinged baking-plate having a cam-shaped rib projecting from its outer side, said rib having ratchet-teeth, an operating-lever engaged with said hinged plate, and a locking-lever adapted to exert pressure on said rib and provided with a dog adapted to engage the teeth thereon, as set forth.

3. In an altar-bread baker, the combination of a supporting-frame having heating devices, a fixed baking-plate, a hinged baking-plate, an operating-lever engaged with said hinged plate and adapted to move it from one position to another, a locking-lever adapted to exert and maintain downward pressure on the hinged plate when the latter is in its baking position, a lever *i*, pivoted to the frame and having one end arranged to be depressed by the downward movement of said locking-lever, and a pin or plunger engaged with the other end of the lever *i* and adapted to force the hinged plate upward from its baking position, as set forth.

In testimony whereof I have signed my name to this specification, in the presence of two subscribing witnesses, this 27th day of January, A. D. 1892.

PATRICK H. HORAN.

Witnesses:
C. F. BROWN,
A. D. HARRISON.